UNITED STATES PATENT OFFICE.

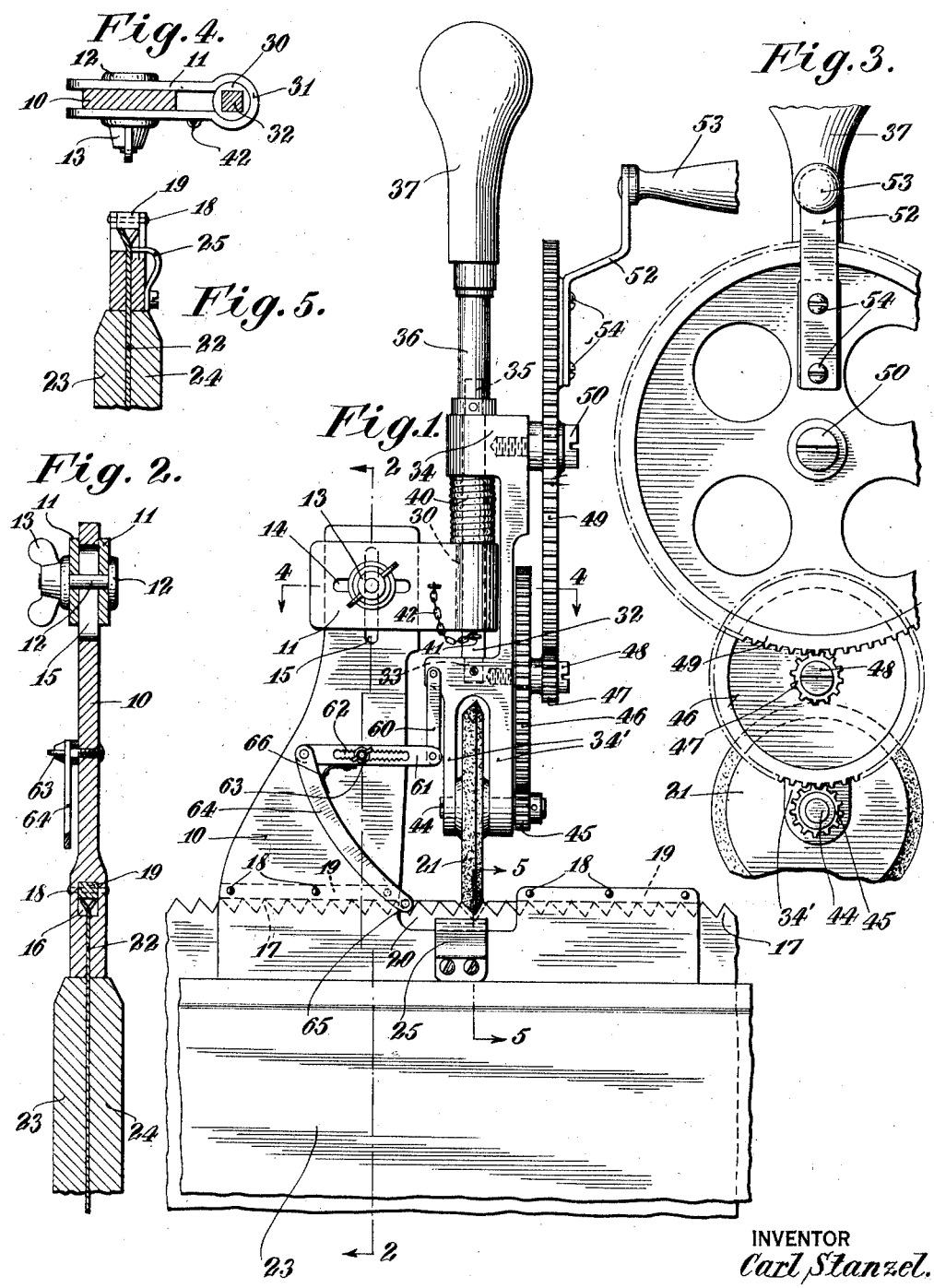

CARL STANZEL, OF NEW YORK, N. Y.

SAW-SHARPENING APPARATUS.

1,385,339.   Specification of Letters Patent.   Patented July 19, 1921.

Application filed October 4, 1919. Serial No. 328,516.

*To all whom it may concern:*

Be it known that I, CARL STANZEL, a citizen of the United States, and a resident of the city, county, and State of New York, have invented certain new and useful Improvements in Saw-Sharpening Apparatus, of which the following is a specification.

The principal object of this invention is to provide a saw sharpener of great practicability, adjustable for saws of any number of teeth per inch, and of a design adapted for durability, efficiency and low cost of production.

Another object is in the provision for gumming with a grinding wheel, and means for assuring duplication of tooth forms.

A further object is to have a flexible saw grinding wheel, which will automatically withdraw the tool from the tooth, and advance the tool.

These objects are attained by the novel construction and combination of parts hereinafter described, and shown in the accompanying drawings, forming a material part of this disclosure, and in which:—

Figure 1 is a front elevation of a saw gummer, made in accordance with the invention, showing a saw blade in operative position.

Fig. 2 is a longitudinal sectional view of the same taken on line 2—2 of Fig. 1.

Fig. 3 is a fragmentary side elevational view.

Fig. 4 is a transverse sectional view on line 4—4 of Fig. 1, and

Fig. 5 is a vertical sectional view on line 5—5 of Fig. 1.

Referring to the drawings in detail, the numeral 10 designates a frame or body having an upright portion adapted to be slidably engaged by the clamp 11, secured by the bolt 12 and wing nut 13, the bolt passing through the slot 14 in the clamp 11 and a slot 15 in the frame 10.

In the thickened base of the frame 10 is a rectangular slot 16 to give clearance for the offset of the saw teeth 17 and secured to the upper portion of the slot 16, by the rivets 18, is a strip of wood or fiber 19, serving as a guide stop and tooth protector.

A recess 20 provides clearance for the grinding wheel 21, while a narrow slot 22 extends inwardly from the base of the frame into the slot 16, providing means for introducing the saw blade into the device.

The clamp jaws 23 and 24 hold the saw loosely and are in turn held by an ordinary bench-vise (not shown) in the drawings. A spring clamp 25 passes through the recess 20 and presses against the saw as shown in Fig. 5 reducing vibration.

A bushing 30 is fixed in the rounded end 31 of the clamps 11, the bushing having a rectangular hole in which is slidably mounted a bar 32 having its reduced lower end 33 secured within the forked wheel frame 34 and its opposite end 35, secured within the shank 36 of the handle 37.

An open wound coiled spring 40 encircles the bar 32 and is interposed between the frame 34 and the clamp 11, limiting the downward movement of the wheel carrying frame and normally holding it in a raised position. A removable pin 41 passes through a hole in the bar 32 and limits the upward movement of the same, a chain 42 being used to prevent loss of the pin 41.

The grinding wheel 21 is secured upon a mandrel 44, rotatably secured within bearings provided in the forks 34' extending down from the wheel frame 34.

The outer extending end of the mandrel has secured upon it a pinion 45 in mesh with a spur gear 46 having formed integral with it a pinion 47 rotatable upon the shoulder screw 48 set in the frame 34 and meshing with the driving spur gear 49 rotatably secured by the shoulder screw 50, set in the upper part of the frame 34, initial rotation being attained through the medium of the crank 52 secured to the spur gear 49 by the screws 54, and provided with an actuating handle 53.

A forked lever 60 pivoted at its upper end to a projecting element of the frame 34, has its lower end pivotally secured to a bar 61 provided with a notched longitudinal slot 62, in which is received an adjustable clamp bolt 63 acting as a fulcrum for the bar.

Pivoted to the outer end of the bar 61 is a curved arm 64 carrying a pin or tooth 65 engageable with the teeth 17 of the saw and by which it is advanced upon actuating the apparatus, the spring 66 returning the arm into position for operating on the second adjacent tooth.

In operation, the machine having been adjusted to operate on the saw, the blade of which is clamped between the elements 23 and 24, the handle 37 is depressed, bringing the wheel 21 into contact with the saw tooth.

The handle 53 is then rotated and, through the gear train, transmits rotary motion to the grinding wheel, which may be fed downward until the pin 41 can be entered into an opening in the vertically movable bar 32.

Upon raising the handle 37 or allowing it to be raised by the spring 40, the frame 34 is raised, including the wheel 21 and link 60, which action causes the bar 61 to turn, moving the arm 64 forward, the pin 65 engaging in the teeth pushes the saw blades forward a distance equivalent to two teeth, as each alternate tooth is alike as to pitch, angle and bevel.

Due to the adjustability of the supporting clamp and ability to turn the frame 34 relative to the body frame 10, it will be seen that saws of widely varying character may be sharpened in an easy and expeditious manner.

It is obvious that by placing a milling tool or circular saw that the device could be used for many other purposes.

Having thus described my invention what I claim as new and desire to secure by Letters Patent, is:—

1. In a saw sharpening apparatus, the combination with an L shaped frame, bifurcated in its lower portion to receive a saw blade, a forked element slidable on the raised portion of said frame, means for securing said forked element adjustably on said frame, an abrading wheel carried in said forked element, means for manually rotating said abrading wheel, and means for raising or lowering said abrading wheel with reference to the teeth of the saw.

2. In a saw sharpening apparatus, the combination with a frame having an elongated and thickened lower member, means in said lower member receptive of the teeth of a saw, a clamp element pivotally engaged at the upper portion of said frame, said clamp element being both vertically and laterally adjustable, a bushing in said clamp member, a rectangular bar slidable in said bushing, a forked frame secured at the lower end of said rectangular bar, a spring disposed between said forked frame and said clamp member, means for manipulating said forked frame, an abrading wheel journaled in said frame, a train of gears adapted to actuate said abrading wheel, means for manually actuating said gear train, and means for advancing the saw blade upon the upward movement of said forked frame.

3. In a saw sharpening apparatus, the combination with an L shaped frame, containing a cushioned recess receptive of a saw blade, a forked element, means for adjustably securing said forked frame with said L shaped frame, an abrading wheel carried in said forked frame, means for manually rotating said abrading wheel, and means for normally keeping said abrading wheel in contact with the saw teeth.

4. In a saw sharpening apparatus, the combination with an L shaped body having a bifurcated lower member and an elongated slot coincident with the upper edge of the bifurcation, said slot being adapted to receive the teeth of a saw, means engageable with the saw upon which said lower member normally rests, a fibrous bar disposed in the mentioned recess, a spring attached to said body adapted to impinge against the saw plate contiguous to its teeth, a forked frame, means for adjustably engaging said forked frame to said body, means for normally holding said forked frame in a raised position, a handle for actuating said frame, an abrading wheel mounted between the forks of said frame, means for manually actuating said wheel, and means for automatically advancing the saw blade coincidently with raising said forked frame.

5. In a saw sharpening apparatus, the combination with a flat, substantially L shaped frame having a slotted lower edge adapted to receive the blade and the teeth of a saw, a strip of relatively soft material fixed in said frame adapted to receive the points of the saw teeth, a spring attached to said frame impinging on the blade of the saw adjacent to the teeth, an abrading wheel, means for adjustably supporting said abrading wheel, means for manually rotating said wheel, a link engaged with the wheel supporting means, a bar containing an elongated slot operated by said link, means engageable in the mentioned slot of said bar whereby it may be fulcrumed at different points along its length, an arm pivoted to said bar, a spring adapted to force said bar outwardly, and a pin carried at the extremity of said arm adapted to operatively engage with the teeth of the saw whereby it is advanced upon the raising of said abrading wheel.

In testimony whereof, I have signed my name to this specification.

CARL STANZEL.